United States Patent
Ichikawa

(10) Patent No.: US 12,065,060 B2
(45) Date of Patent: Aug. 20, 2024

(54) VEHICLE DISPLAYING A THRESHOLD VALUE OF POWER THAT IS BEING OUTPUT FROM EACH OF THE FUEL CELL AND THE POWER STORAGE DEVICE

(71) Applicant: Toyota Jidosha Kabushiki Kaisha, Toyota (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 855 days.

(21) Appl. No.: 17/162,274

(22) Filed: Jan. 29, 2021

(65) Prior Publication Data

US 2021/0237616 A1 Aug. 5, 2021

(30) Foreign Application Priority Data

Feb. 3, 2020 (JP) .................. 2020-016415

(51) Int. Cl.
| | | |
|---|---|---|
| B60L 58/00 | (2019.01) | |
| B60K 35/00 | (2006.01) | |
| B60L 58/12 | (2019.01) | |
| B60L 58/30 | (2019.01) | |
| B60L 58/40 | (2019.01) | |
| B60K 35/28 | (2024.01) | |

(52) U.S. Cl.
CPC .............. *B60L 58/40* (2019.02); *B60K 35/00* (2013.01); *B60L 58/12* (2019.02); *B60L 58/30* (2019.02); *B60K 35/28* (2024.01); *B60K 2360/167* (2024.01); *B60K 2360/169* (2024.01)

(58) Field of Classification Search
CPC .......... B60L 58/40; B60L 58/12; B60L 58/30; B60K 35/00; B60K 35/28; B60K 2360/167; B60K 2360/169
USPC ........................................................ 701/22
See application file for complete search history.

(56) References Cited

U.S. PATENT DOCUMENTS

| | | | | |
|---|---|---|---|---|
| 2005/0128065 A1* | 6/2005 | Kolpasky | ................ | G09F 21/04 340/461 |
| 2007/0176762 A1* | 8/2007 | Aoyagi | ............. | H01M 8/04589 340/439 |
| 2010/0273080 A1* | 10/2010 | Noguchi | ............. | H01M 8/0432 429/442 |

(Continued)

FOREIGN PATENT DOCUMENTS

| | | |
|---|---|---|
| JP | 2002-044807 A | 2/2002 |
| JP | 2010-279124 A | 12/2010 |

(Continued)

*Primary Examiner* — Mahmoud S Ismail
(74) *Attorney, Agent, or Firm* — Dinsmore & Shohl LLP

(57) ABSTRACT

An FCV includes: a driving device that generates traveling power by using at least one of FC energy and battery energy; and a display device that presents an indicator indicating the traveling power that is being generated by the driving device. When the traveling power is less than a threshold value, the driving device generates the traveling power by using one energy of the FC energy and the battery energy without using the other energy of the FC energy and the battery energy. When the traveling power is more than or equal to the threshold value, the driving device generates the traveling power by using both the FC energy and the battery energy. At the indicator, the display device presents information indicating the threshold value.

8 Claims, 9 Drawing Sheets

(56) References Cited

U.S. PATENT DOCUMENTS

| | | | |
|---|---|---|---|
| 2011/0295456 A1* | 12/2011 | Yamamoto | B60L 50/16 903/903 |
| 2012/0115057 A1* | 5/2012 | Yoshida | H01M 8/04619 429/430 |
| 2014/0297075 A1* | 10/2014 | Endo | B60W 10/06 180/65.265 |
| 2018/0118028 A1* | 5/2018 | Ueo | B60L 1/006 |
| 2019/0039512 A1* | 2/2019 | Taki | B60K 35/00 |
| 2020/0384859 A1* | 12/2020 | Higuchi | B60K 6/46 |

FOREIGN PATENT DOCUMENTS

| | | |
|---|---|---|
| JP | 2010-285091 A | 12/2010 |
| WO | 2011004493 A1 | 1/2011 |
| WO | 2011030444 A1 | 3/2011 |

* cited by examiner

VEHICLE DISPLAYING A THRESHOLD VALUE OF POWER THAT IS BEING OUTPUT FROM EACH OF THE FUEL CELL AND THE POWER STORAGE DEVICE

CROSS REFERENCE TO RELATED APPLICATIONS

This nonprovisional application is based on Japanese Patent Application No. 2020-016415 filed on Feb. 3, 2020, with the Japan Patent Office, the entire contents of which are hereby incorporated by reference.

BACKGROUND

Field

The present disclosure relates to a vehicle.

Description of the Background Art

WO 2011/004493 discloses a vehicle including a fuel cell. This vehicle includes the fuel cell and a battery. The battery functions as a source of storage for an excess of electric power, a source of storage for regenerative energy generated during regenerative braking, and an energy buffer during load fluctuations resulting from acceleration or deceleration of the vehicle (see WO 2011/004493).

SUMMARY

It is considered to employ the following configuration: when traveling power is more than or equal to a threshold value while the vehicle described in WO 2011/004493 generates the traveling power using one of energy of the fuel cell and energy of the battery without using the other, the traveling power is generated using both the energy of the fuel cell and the energy of the battery. That is, when the traveling power becomes more than or equal to the threshold value, the vehicle employing this configuration switches energy used by the vehicle.

In the vehicle employing this configuration, it is desirable to allow a user to intuitively recognize the switching of energy used by the vehicle.

The present disclosure has been made to solve such a problem, and has an object to allow a user to intuitively recognize switching of energy used by a vehicle.

According to a certain aspect of the present disclosure, a vehicle includes: a fuel cell; a power storage device chargeable with electric power supplied from outside; a driving device that generates traveling power by using at least one of energy output from the fuel cell and energy output from the power storage device; and a display device that presents an indicator indicating power that is being output from each of the fuel cell and the power storage device. When the power is less than a threshold value, the driving device generates the traveling power by using one energy of the energy output from the fuel cell and the energy output from the power storage device without using other energy of the energy output from the fuel cell and the energy output from the power storage device. When the power is more than or equal to the threshold value, the driving device generates the traveling power by using the one energy and the other energy. At the indicator, the display device presents information indicating the threshold value.

With such a configuration, at the indicator, the information indicating the threshold value is presented to indicate that switching is made from the state in which one of the energy output from the fuel cell and the energy output from the power storage device is used to the state in which both the energy output from the fuel cell and the energy output from the power storage device are used. Therefore, by allowing the user to recognize the threshold value, the user can easily intuitively recognize the switching of energy used by the vehicle.

In a certain aspect, when a first mode is set in which the driving device generates the traveling power by using the one energy, the display device presents, as the information at the indicator, a sign indicating that the driving device generates the traveling power by using not only the one energy but also the other energy. When a second mode is set in which the driving device generates the traveling power by using the other energy, the display device presents, as the information at the indicator, a sign indicating that the driving device generates the traveling power by using not only the other energy but also the one energy.

With such a configuration, in the first mode in which the driving device uses the one energy of the energy output from the fuel cell and the energy output from the power storage device, the user can recognize the sign indicating that the traveling power is generated by using not only the one energy but also the other energy when the traveling power becomes more than or equal to the threshold value. Further, in the second mode in which the driving device uses the other energy of the energy output from the fuel cell and the energy output from the power storage device, the user can recognize the sign indicating that the traveling power is generated by using not only the other energy but also the one energy when the traveling power becomes more than or equal to the threshold value.

In a certain aspect, the indicator includes a first indicator having an extended shape, and a second indicator having an extended shape. The first indicator includes a gauge that is increased along an extension direction of the first indicator in response to an increase in the output of the one energy. The second indicator includes a gauge that is increased along an extension direction of the second indicator in response to an increase in the output of the other energy. The indicator further includes a zero position at which the gauges indicate 0. When the first mode is set, the display device presents the first indicator and the second indicator such that one end of the first indicator is located at the zero position and the other end of the first indicator coincides with one end of the second indicator. When the second mode is set, the display device presents the second indicator and the first indicator such that the one end of the second indicator is located at the zero position and the other end of the second indicator coincides with the one end of the first indicator.

With such a configuration, when the first mode is set in which the one energy of the energy output from the fuel cell and the energy output from the power storage device is used, the first indicator including the gauge that is increased in response to an increase in the output of the one energy is presented such that the one end of the first indicator is located at the zero position at which the gauge indicates 0. Therefore, the user can intuitively recognize that the one energy of the energy output from the fuel cell and the energy output from the power storage device is used with precedence. On the other hand, when the second mode is set in which the other energy of the energy output from the fuel cell and the energy output from the power storage device is used, the second indicator including the gauge that is increased in response to an increase in the output of the other energy is presented such that the one end of the second indicator is located at the zero position at which the gauge indicates 0. Therefore, the user can intuitively recognize that the other energy of the energy output from the fuel cell and the energy output from the power storage device is used with precedence.

In a certain aspect, when the first mode is set, the display device presents, as the information at a boundary portion between the first indicator and the second indicator, a sign indicating that not only the one energy but also the other energy are used. When the second mode is set, the display device presents, as the information at the boundary portion between the first indicator and the second indicator, a sign indicating that not only the other energy but also the one energy are used.

With such a configuration, when the first mode is set, the sign indicating that not only the one energy but also the other energy are used is presented at the boundary portion between the first indicator and the second indicator, whereas when the second mode is set, the sign indicating that not only the other energy but also the one energy are used is presented as the information at the boundary portion between the first indicator and the second indicator. Therefore, the user can intuitively recognize the energy used.

In a certain aspect, the display device presents the gauge of the first indicator and the gauge of the second indicator in different manners.

With such a configuration, the user can intuitively recognize the gauge that is increased in response to an increase in the output of the one energy and the gauge that is increased in response to an increase in the output of the other energy.

In a certain aspect, each of the first indicator and the second indicator extends in an arc direction.

With such a configuration, each of the first indicator and the second indicator can be presented in a presentation region extending in the arc direction.

In a certain aspect, each of the first indicator and the second indicator extends in a horizontal direction.

With such a configuration, each of the first indicator and the second indicator can be presented in a presentation region extending in the horizontal direction.

In a certain aspect, each of the first indicator and the second indicator extends in a vertical direction.

With such a configuration, each of the first indicator and the second indicator can be presented in a presentation region extending in the vertical direction.

In a certain aspect, when the driving device generates the traveling power with the energy output from the fuel cell being regarded as the one energy and with the energy output from the power storage device being regarded as the other energy, the display device presents, as the information, a sign indicating that the driving device generates the traveling power by using not only the energy output from the fuel cell but also the energy output from the power storage device.

With such a configuration, while the traveling power is generated by using the energy output from the fuel cell, the user can recognize the sign indicating that the traveling power is generated by using not only the energy output from the fuel cell but also the energy output from the power storage device when the traveling power becomes more than or equal to the threshold value.

In a certain aspect, when the driving device generates the traveling power with the energy output from the power storage device being regarded as the one energy and with the energy output from the fuel cell being regarded as the other energy, the display device presents, as the information, a sign indicating that the driving device generates the traveling power by using not only the energy output from the power storage device but also the energy output from the fuel cell.

With such a configuration, while the traveling power is generated by using the energy output from the power storage device, the user can recognize the sign indicating that the traveling power is generated by using not only the energy output from the power storage device but also the energy output from the fuel cell when the traveling power becomes more than or equal to the threshold value.

The foregoing and other objects, features, aspects and advantages of the present disclosure will become more apparent from the following detailed description of the present disclosure when taken in conjunction with the accompanying drawings.

DETAILED DESCRIPTION

Figure 1:
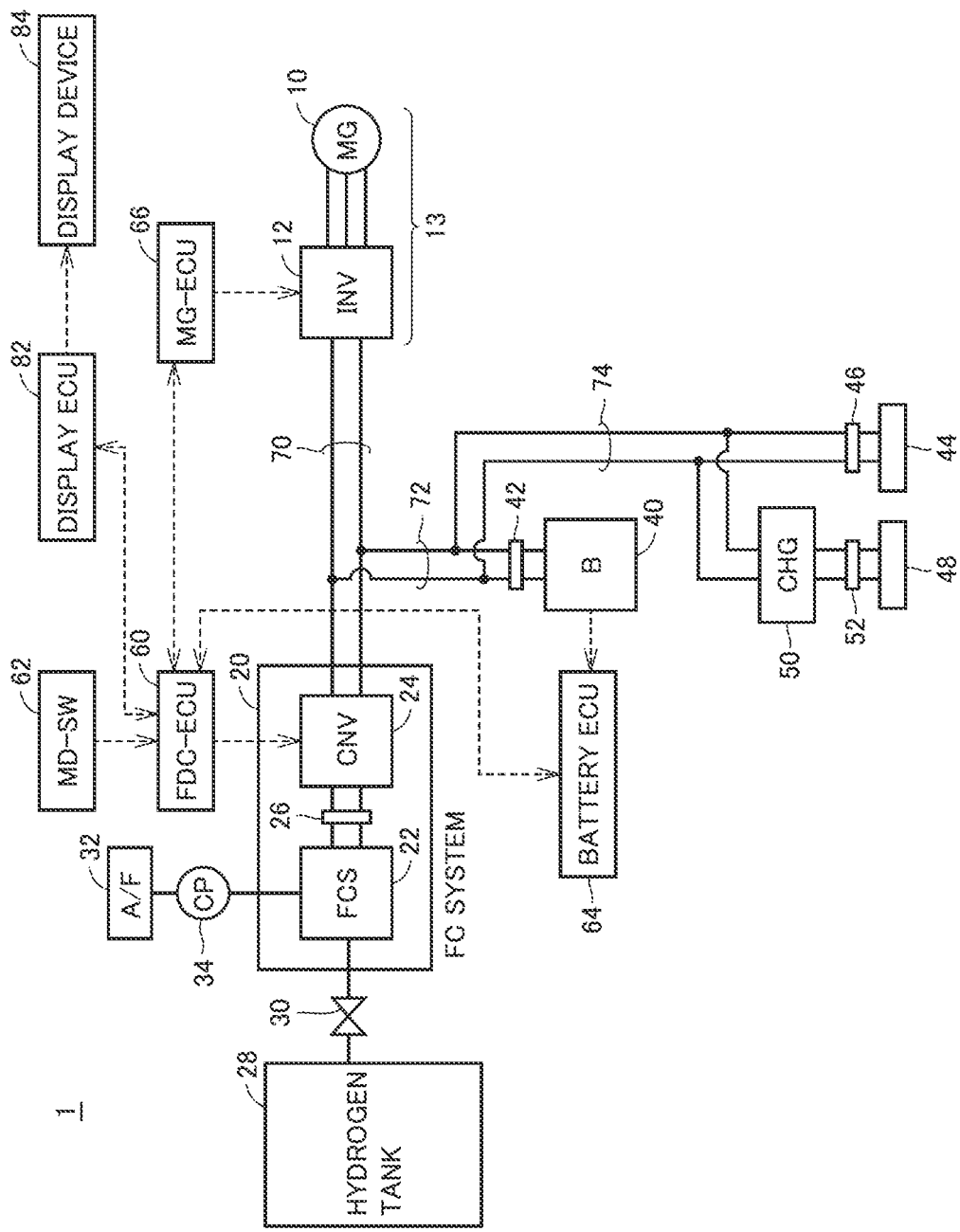
FIG. 1 is a diagram showing an overall configuration of an FCV according to a first embodiment of the present disclosure.

Hereinafter, embodiments of the present disclosure will be described in detail with reference to figures. It should be noted that in the figures, the same or corresponding portions are denoted by the same reference characters, and will not be described repeatedly. In the description below, a fuel cell will be also referred to as "FC". Also in the description below, a fuel cell vehicle including a fuel cell will be also referred to as "FCV".

First Embodiment

[As to Overall Configuration]

FIG. 1 is a diagram showing an overall configuration of an FCV 1 according to a first embodiment of the present disclosure. Referring to FIG. 1, FCV 1 includes a motor generator (hereinafter, referred to as "MG") 10, an inverter 12, an FC system 20, a hydrogen tank 28, a supply valve 30, an air filter 32, and a compressor 34.

MG 10 is an AC rotating electric machine such as a three-phase AC synchronous electric motor having a rotor in which a permanent magnet is embedded. MG 10 is driven by inverter 12 to generate rotational driving force. The driving force generated by MG 10 is transmitted to driving wheels (not shown). During braking of FCV 1 or the like, MG 10 is operated as a generator to generate electric power. The electric power generated by MG 10 can be rectified by inverter 12 and can be stored in battery 40. Battery 40 is chargeable with electric power supplied from outside. Battery 40 corresponds to a "power storage device" of the present disclosure.

Inverter 12 is provided between a power line 70 and MG 10. Inverter 12 drives MG 10 based on a driving signal from an MG-ECU 66 described below. Inverter 12 is constituted of, for example, a bridge circuit including switching elements for three phases.

FC system 20 includes an FC stack 22, a boost converter 24, and a relay 26. FC stack 22 is a structure in which a plurality of (for example, several ten to several hundred) solid polymer type cells are stacked in series, for example. In each of the cells, catalyst electrodes are joined to both surfaces of an electrolyte membrane, for example. Each cell is formed by sandwiching the catalyst electrodes between electrically conductive separators. Each of the cells generates electric power by causing an electrochemical reaction between hydrogen supplied to an anode and oxygen (air) supplied to a cathode.

Boost converter 24 boosts electric power generated by FC stack 22 (for example, several hundred V) based on a control signal from an FDC-ECU 60 described below, and outputs the boosted electric power to power line 70. Relay 26 is provided in an electric path between FC stack 22 and boost converter 24. Relay 26 is opened when the vehicle system is non-operational or when FC system 20 is not in use.

Hydrogen tank 28 stores hydrogen as a fuel to be supplied to FC stack 22. Hydrogen tank 28 is a lightweight, high-strength and high-pressure tank including a carbon fiber reinforced plastic layer, for example. Hydrogen tank 28 can store hydrogen at several ten MPa, for example. Hydrogen is supplied from hydrogen tank 28 to FC stack 22 through supply valve 30.

Compressor 34 is a device for supplying oxygen to FC stack 22. Compressor 34 suctions oxygen (air) through air filter 32, compresses the oxygen, and supplies the compressed oxygen to FC stack 22.

FCV 1 further includes a battery 40, a DC (Direct Current) inlet 44, an AC (Alternate Current) inlet 48, a charger 50, and relays 42, 46, 52.

Battery 40 is a chargeable/dischargeable power storage device. Battery 40 includes an assembled battery including a plurality of battery cells (for example, several hundred cells). Each of the battery cells is, for example, a secondary battery such as a lithium ion battery or a nickel-metal hydride battery. It should be noted that the lithium ion secondary battery is a secondary battery in which lithium serves as a charge carrier. The lithium ion secondary battery may include not only a general lithium ion secondary battery employing a liquid electrolyte but also an all-solid-state battery employing a solid electrolyte. Instead of battery 40, FCV 1 may use a power storage element such as an electric double layer capacitor.

Battery 40 is connected to a power line 72 via relay 42. Power line 72 is connected to power line 70. Battery 40 stores electric power for driving MG 10. Battery 40 supplies electric power to inverter 12 through power lines 72, 70. Battery 40 is charged by receiving electric power generated by MG 10 during braking of FCV 1 or the like. Battery 40 functions as an energy buffer that absorbs load fluctuations caused by acceleration and deceleration of FCV 1 and that stores electric power generated by MG 10 during braking of FCV 1 or the like.

In the present embodiment, battery 40 can be charged by receiving electric power supplied from a power supply (not shown) external to the vehicle through DC inlet 44 or AC inlet 48. Hereinafter, the charging of battery 40 by the power supply external to the vehicle will be also referred to as "external charging".

DC inlet 44 is connected to a power line 74 via relay 46, and power line 74 is connected to power line 72. DC inlet 44 can be engaged with a connector of a DC charging cable extending from a charging station or the like (not shown) external to the vehicle. DC inlet 44 receives high-voltage DC power supplied from the charging station or the like and outputs the high-voltage DC power to power line 74.

AC inlet 48 is connected to charger 50 via relay 52. AC inlet 48 can be engaged with a connector of an AC charging cable extending from a charging station or the like external to the vehicle. AC inlet 48 receives AC power (for example, system power) supplied from the charging station or the like and outputs the AC power to charger 50. Charger 50 is connected to power line 74, and converts the AC power received from AC inlet 48 into electric power having a voltage level for battery 40, and outputs the converted electric power to power line 74.

Relay 42 is provided between battery 40 and power line 72, and is closed during system startup of FCV 1 or during execution of external charging. Relay 46 is provided between DC inlet 44 and power line 74, and is closed when external charging (for example, DC charging) is performed using DC inlet 44. Relay 52 is provided between AC inlet 48 and charger 50, and is closed when external charging (AC charging) is performed using AC inlet 48 and charger 50.

Thus, FCV 1 is a plug-in FCV in which battery 40 is chargeable using a power supply external to the vehicle and connected to DC inlet 44 or AC inlet 48. FCV 1 can travel using electric power stored in battery 40 as a result of external charging.

FCV 1 further includes an FDC-ECU (Electronic Control Unit) 60, a mode switch (MD-SW) 62, a battery ECU 64, and an MG-ECU 66. Each of FDC-ECU 60, battery ECU 64, MG-ECU 66, and a below-described display ECU 82 includes a CPU (Central Processing Unit), a memory (ROM (Read Only Memory) and RAM (Random Access Memory)), and an input/output buffer (each not shown). The CPU loads a program stored in the ROM into a RAM or the like and executes the program. In the program stored in the ROM, a process to be performed by a corresponding ECU is written.

Hereinafter, MG 10 and inverter 12 may be referred to as a "driving device 13". Power generated by driving device 13 is also referred to as "traveling power". FCV 1 travels based on the traveling power. Power requested for FCV 1 to cause driving device 13 to generate the "traveling power" is also referred to as "requested power". In other words, the requested power is power requested for FDC-ECU 60. In the present embodiment, the traveling power and the requested power represent the same concept. However, the traveling power and the requested power may represent different concepts.

FDC-ECU 60 calculates an output requested for FC system 20 (output electric power of FC system 20) based on the traveling power requested for FCV 1 (i.e., requested power) and a charging/discharging request for battery 40, and controls boost converter 24 to cause FC system 20 to output the calculated electric power. It should be noted that the traveling power requested for FCV 1 is calculated based on an amount of operation on an accelerator pedal, a vehicle speed, and the like. In the first embodiment, the traveling power is calculated by FDC-ECU 60, but may be calculated by a different ECU. The different ECU is, for example, a vehicle ECU (not shown) that generally controls the whole of the vehicle.

FDC-ECU 60 switches the traveling mode in accordance with a setting made by way of mode switch 62. FCV 1 includes FC system 20 and battery 40 as power supplies, and electric power can be stored in battery 40. In FCV 1 according to the first embodiment, there are four traveling modes corresponding to manners of use of FC system 20 and battery 40. A user can select a traveling mode by operating mode switch 62. The traveling modes will be described in detail later.

Mode switch 62 is a switch for allowing the user to set a traveling mode. Mode switch 62 may be a dedicated switch or may be formed in a touch panel display of a navigation device or the like.

Battery ECU 64 monitors voltage, current, temperature, and the like of battery 40. The voltage, current, temperature, and the like of battery 40 are detected by various types of sensors (not shown). Battery ECU 64 calculates an SOC of battery 40 based on the detected values of the voltage, current, temperature, and the like of battery 40. The calculated SOC value is transmitted to FDC-ECU 60. It should be noted that the SOC may be calculated by FDC-ECU 60 based on the detected values of the voltage, current, temperature, and the like of battery 40.

In FCV 1, battery 40 is connected to power line 70 not via a converter. Typically, an amount of charging/discharging of battery 40 is determined by a difference between the traveling power requested by inverter 12 and MG 10 and the output of FC system 20. Therefore, by controlling the output of FC system 20 by FDC-ECU 60 based on the traveling power, the charging/discharging and SOC of battery 40 can be controlled.

In FCV 1 according to the first embodiment, a target SOC indicating a target value of SOC is calculated by FDC-ECU 60 in accordance with a traveling mode. A requested amount of charging/discharging of battery 40 is calculated based on a deviation between the SOC and the target SOC so as to attain an SOC of battery 40 close to the target SOC. Based on the calculated requested amount of charging/discharging and the traveling power, the output of FC system 20 is controlled by FDC-ECU 60.

As a method for calculating an SOC, various known methods can be used such as: a method employing an OCV-SOC curve (map or the like) indicating a relation between an OCV (Open Circuit Voltage) and an SOC; and a method employing an integrated value of current input to and output from battery 40.

From FDC-ECU 60, MG-ECU 66 receives a calculated value of the traveling power requested for FCV 1. MG-ECU 66 generates, based on the traveling power, a signal for driving MG 10 using inverter 12, and outputs the signal to inverter 12.

FCV 1 further includes display ECU 82 and a display device 84. Display ECU 82 controls presentation of display device 84. Display ECU 82 is also referred to as a "display control device". Display device 84 is installed, for example, at a position directly facing a driver of FCV 1. Display device 84 presents various pieces of information. Display device 84 presents a below-described indicator, for example. Display ECU 82 controls presentation of display device 84 under control of FDC-ECU 60.

<As to Traveling Modes>

As described above, FCV 1 includes FC system 20 and battery 40. In FCV 1 according to the first embodiment, the four traveling modes are provided to correspond to the respective manners of using FC system 20 and battery 40.

Figure 2:
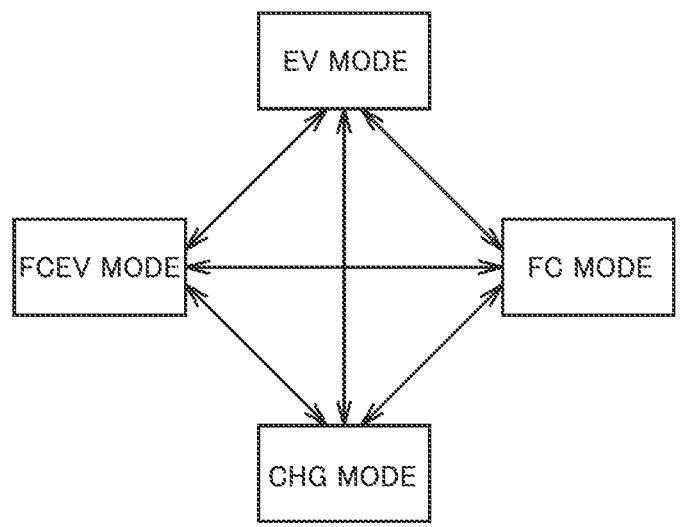
FIG. 2 is a diagram showing traveling modes provided in the FCV.

FIG. 2 is a diagram showing the traveling modes provided in FCV 1. Referring to FIG. 2, the traveling modes of FCV 1 according to the first embodiment includes the following four traveling modes: an "FC mode", an "FCEV mode", an "EV mode", and a "CHG mode". The FC mode may be referred to as a "first mode". The "EV mode" may be referred to as a "second mode". The user of FCV 1 can select a desired traveling mode from these traveling modes. The user of FCV 1 can select a desired traveling mode by operating mode switch 62, for example.

Figure 3:
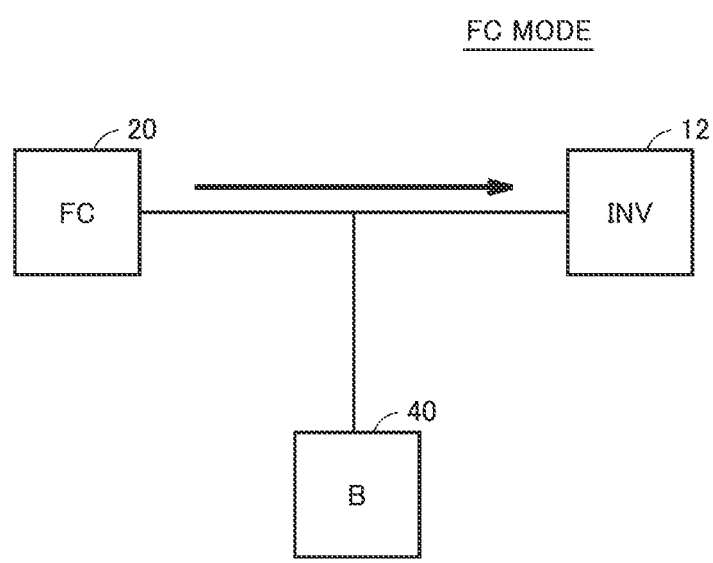
FIG. 3 is a diagram showing a flow of supply of electric power in an FC mode.

FIG. 3 is a diagram showing a flow of supply of electric power in the FC mode. Hereinafter, energy output from battery 40 will be also referred to as "battery energy". Energy output from FC system 20 will be also referred to as "FC energy". Referring to FIG. 3, the FC mode is a mode in which traveling power is generated by using the FC energy without using the battery energy.

In the FC mode, FC system 20 (boost converter 24) is controlled by FDC-ECU 60 to cause FC system 20 to output power comparable to the requested power in order to travel using the FC energy.

Figure 4:
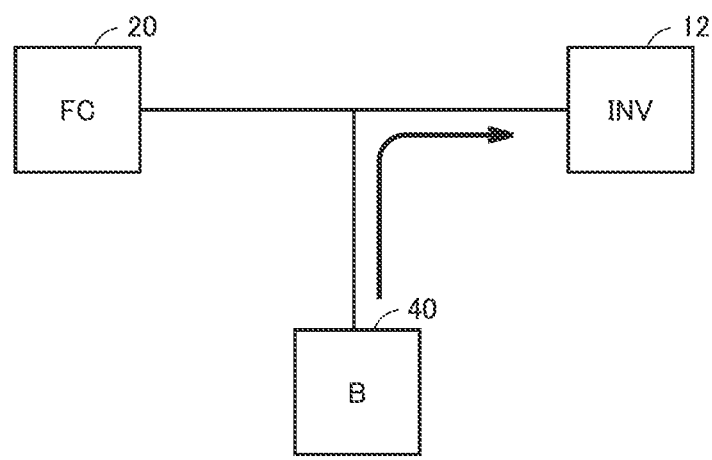
FIG. 4 is a diagram showing a flow of supply of electric power in an EV mode.

FIG. 4 is a diagram showing a flow of supply of electric power in the EV mode. Referring to FIG. 4, the EV mode is a mode in which traveling power is generated by using the battery energy without using the FC energy.

Figure 5:
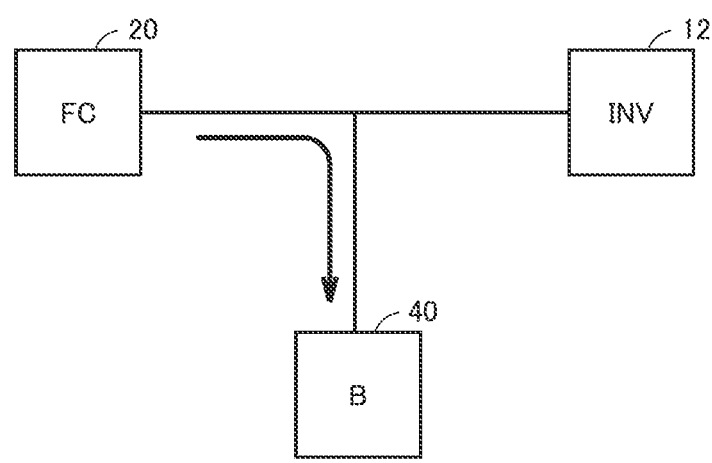
FIG. 5 is a diagram showing a flow of supply of electric power in a CHG mode.

FIG. 5 is a diagram showing a flow of supply of electric power in the CHG mode. Referring to FIG. 5, the CHG mode is a mode in which the SOC of battery 40 is increased to a predetermined level by actively charging battery 40 using the output of FC system 20 when the SOC of battery 40 is low.

Figure 6:
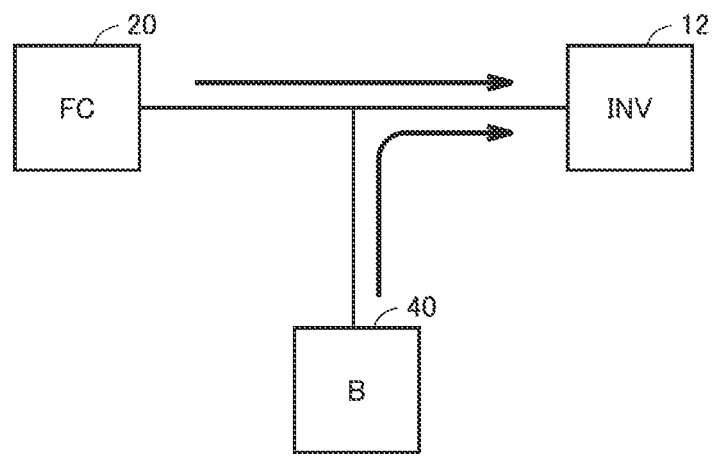
FIG. 6 is a diagram showing a flow of supply of electric power in an FCEV mode.

FIG. 6 is a diagram showing a flow of supply of electric power in the FCEV mode switched from the FC mode (i.e., the FCEV mode set in response to a below-described first control condition being satisfied). FIG. 6 is a diagram also showing a flow of supply of electric power in the FCEV mode switched from the EV mode (i.e., the FCEV mode set in response to a below-described second control condition being satisfied). Referring to FIG. 6, the FCEV mode is a hybrid mode in which traveling power is generated by using both the FC energy and the battery energy.

When one of the first control condition, the second control condition, and a third control condition is satisfied, FCV 1 is set to the FCEV mode. First, the first control condition will be described. When the FC mode is set, large traveling power may be requested due to, for example, the accelerator pedal being pressed down greatly. In this case, the first control condition is a condition that is satisfied when the traveling power based on the FC energy becomes more than or equal to the threshold value of FC system 20. With the FCEV mode, both the FC energy and the battery energy are used. That is, with the FCEV mode, energy corresponding to an amount of shortage in the traveling power is supplied from battery 40. Thus, the FC mode is a mode in which the FC energy of the FC energy and the battery energy is used with precedence.

Next, the second control condition will be described. When the EV mode is set, large traveling power may be requested due to, for example, the accelerator pedal being pressed down greatly. In this case, the second control condition is a condition that is satisfied when the traveling power based on the battery energy becomes more than or equal to the threshold value of battery 40. With the FCEV mode, both the FC energy and the battery energy are used. That is, with the FCEV mode, energy corresponding to an amount of shortage in the traveling power is supplied from FC system 20. Thus, the EV mode is a mode in which the battery energy of the FC energy and the battery energy is used with precedence.

It should be noted that the third control condition is a condition that is satisfied when the FCEV mode is set by way of a setting made by mode switch 62.

Figure 7:
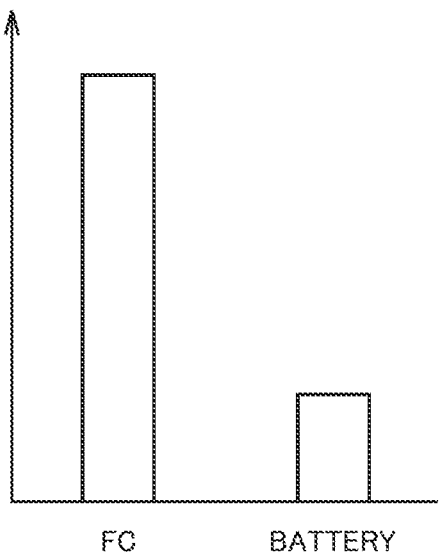
FIG. 7 is a diagram showing an amount of energy.

FIG. 7 is a diagram for illustrating hydrogen serving as the fuel of FC system 20 and electric power stored in battery 40. As shown in FIG. 7, energy of the electric power stored in battery 40 is smaller than hydrogen energy. In other words, the maximum travel distance when FC system 20 is full of hydrogen energy is longer than the maximum travel distance when battery 40 is full of energy.

[As to Presentation by Display Device]

Next, an indicator presented by display device 84 will be described. In the present embodiment, the indicator indicates "power that is being output from FC system 20 and battery 40". In the present embodiment, the "power that is being output from FC system 20 and battery 40" is the traveling power that is being generated by driving device 13. It should be noted that as a modification, the "power that is being output from FC system 20 and battery 40" may be the "requested power". In this modification, the indicator presents the "requested power".

Figure 8:
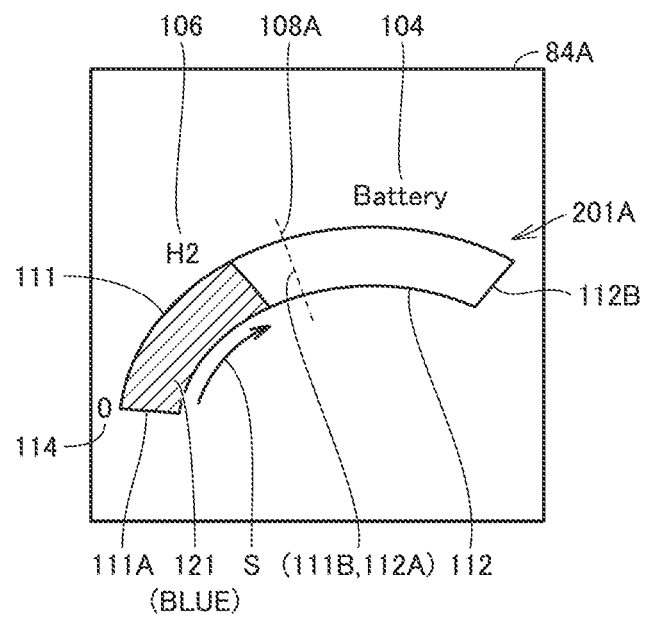
FIG. 8 is a diagram showing an exemplary indicator presented when the EV mode is set.

Each of FIGS. 8 to 11 is a diagram for illustrating the indicator. In the present embodiment, the indicator is presented in a different manner in accordance with whether the FC mode is set or the EV mode is set. The indicator is presented in a presentation region 84A of display device 84. FIG. 8 is a diagram showing an exemplary indicator 201A presented when the FC mode is set.

Indicator 201A includes a first indicator 111 and a second indicator 112. First indicator 111 has an extended shape. Second indicator 112 has an extended shape. Each of first indicator 111 and second indicator 112 has an arc shape.

In FIG. 8, first indicator 111 has one end 111A and other end 111B in an extension direction S. Second indicator 112 has one end 112A and other end 112B in extension direction S. That is, first indicator 111 is an indicator falling within a range from one end 111A to other end 111B in extension direction S. Second indicator 112 is an indicator falling within a range from one end 112A to other end 112B in extension direction S. In FIG. 8 as well as FIGS. 9 to 11 and 13 to 16 described later, extension direction S is illustrated for the sake of convenience. Actually, extension direction S is not presented on display device 84.

First indicator 111 has a first gauge 121. In the example of FIG. 8, first gauge 121 is provided with hatching. First gauge 121 is increased along extending direction S of first indicator 111 in response to an increase in the FC energy. That is, first indicator 111 is an indicator related to the FC energy. Identification information 106 is presented for first indicator 111. In the present embodiment, identification information 106 is information for allowing the user to intuitively recognize a source of supply of energy to driving device 13. In the example of FIG. 8, identification information 106 is represented by the text "H2". "H2" is text representing hydrogen. Therefore, identification information 106 is text for allowing the user to identify "the source of supply of energy to driving device 13 is FC system 20". In the example of FIG. 8, identification information 106 is presented in the vicinity of first indicator 111.

Second indicator 112 is used when switching is made from the FC mode to the FCEV mode in response to the first control condition being satisfied. That is, second indicator 112 is used when not only the FC energy but also the battery energy are used. Identification information 104 is presented for second indicator 112. In the present embodiment, identification information 104 is information for allowing the user to intuitively recognize a source of supply of energy to driving device 13. In the example of FIG. 8, identification information 104 is the text "Battery". Therefore, identification information 104 is text for allowing the user to identify "the source of supply of energy to driving device 13 is battery 40". In the example of FIG. 8, identification information 104 is presented in the vicinity of second indicator 112.

Indicator 201A includes a zero position 114. The zero position 114 is a position at which the gauge (first gauge 121 in the example of FIG. 8) indicates zero. Zero information is presented at the zero position 114. In the example of FIG. 8, the zero information is the numeral "0". One end 111A of first indicator 111 is located at zero position 114. When the FC energy is "0", first gauge 121 is not presented. Therefore, when the FC energy is "0", the user can recognize "the FC energy is '0'" by way of the zero information presented at zero position 114.

First indicator 111 and second indicator 112 are presented side by side such that other end 111B of first indicator 111 coincides with one end 112A of second indicator 112. A portion at which other end 111B of first indicator 111 coincides with one end 112A of second indicator 112 will be also referred to as a "boundary portion". Threshold value information 108A is presented at the boundary portion of FIG. 8.

Here, threshold value information 108A is information indicating a threshold value of FC system 20. In the example of FIG. 8, threshold value information 108A is indicated by a broken line. Threshold value information 108A may be other information as long as the threshold value of FC system 20 can be recognized by the user. Threshold value information 108A may be, for example, the text "Th".

As described above, when the traveling power based on the FC energy becomes more than or equal to the threshold value (i.e., the threshold value indicated by threshold value information 108A) while the FC mode is set, the first control condition is satisfied, with the result that switching is made to the FCEV mode. That is, threshold value information 108A also serves as a sign indicating that traveling power is generated by using not only the FC energy but also the battery energy. Threshold value information 108A also serves as a sign indicating that switching is made from the FC mode to the FCEV mode.

Figure 9:
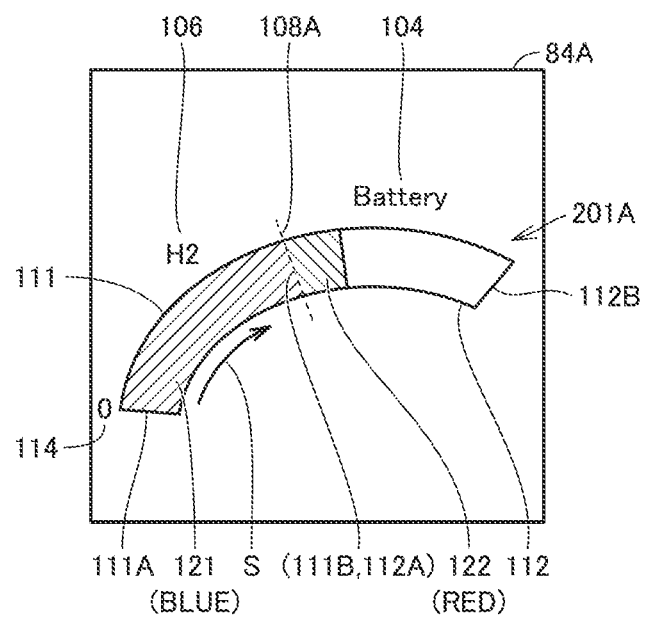
FIG. 9 is a diagram showing an indicator when switching is made from the EV mode to the FCEV mode.

FIG. 9 is a diagram showing an indicator when switching is made from the FC mode to the FCEV mode in response to the first control condition being satisfied. FIG. 9 shows an example in which the gauge exceeds the threshold value indicated by threshold value information 108A and a gauge is also presented at second indicator 112. The gauge presented at second indicator 112 will be also referred to as a "second gauge 122". In the present embodiment, first gauge 121 and second gauge 122 are presented in different manners. First gauge 121 is presented in a first color. First gauge 121 represents the FC energy (i.e., energy based on hydrogen). Thus, in a certain aspect, the first color is a color that suggests hydrogen. The first color is, for example, blue. Second gauge 122 is presented in a second color. Second gauge 122 is the battery energy (i.e., energy based on electric power). Thus, in a certain aspect, the second color is a color that suggests electric power. The second color is, for example, red. It should be noted that as a modification, first gauge 121 and second gauge 122 may be presented in the same manner.

As shown in FIGS. 8 and 9, in the FC mode in which the FC energy is used with precedence, one end 111A of first indicator 111 related to the FC energy is located at zero position 114. Accordingly, indicator 201A of each of FIGS. 8 and 9 allows the user to intuitively recognize that the FC energy is used with precedence.

Figure 10:
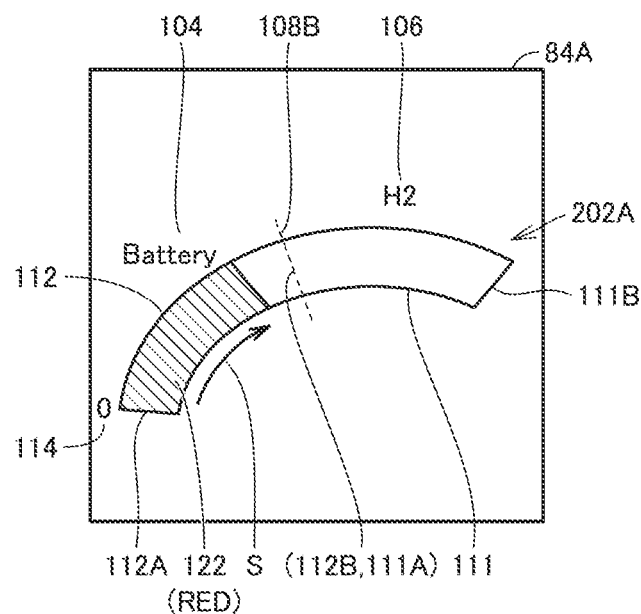
FIG. 10 is a diagram showing an exemplary indicator presented when the FC mode is set.

FIG. 10 is a diagram showing an exemplary indicator 202A presented when the EV mode is set. As shown in FIGS. 8 and 10, a positional relation between first indicator 111 and second indicator 112 at indicator 202A is opposite to the positional relation between first indicator 111 and second indicator 112 at indicator 201A.

That is, as shown in FIG. 10, one end 112A of second indicator 112 is located at zero position 114. Zero position 114 is a position at which the gauge (second gauge 122 in the example of FIG. 10) indicates zero. When the battery energy is "0", second gauge 122 is not presented. Therefore, when the battery energy is "0", the user can recognize "the battery energy is '0'" by way of the zero information presented at zero position 114.

At indicator 202A, first indicator 111 and second indicator 112 are presented side by side such that other end 112B of second indicator 112 coincides with one end 111A of first indicator 111. A portion at which other end 111B of first indicator 111 coincides with one end 112A of second indicator 112 will be also referred to as a "boundary portion". Threshold value information 108B is presented at the boundary portion of FIG. 10.

Here, threshold value information 108B is information indicating a threshold value of battery 40. In the example of FIG. 10, threshold value information 108B is indicated by a broken line. However, threshold value information 108B may be other information as long as the threshold value of battery 40 can be recognized by the user. Threshold value information 108A may be, for example, the text "Th".

As described above, when the traveling power based on the battery energy becomes more than or equal to the threshold value (i.e., the threshold value indicated by threshold value information 108B) while the EV mode is set, the second control condition is satisfied, with the result that switching is made to the FCEV mode. That is, threshold value information 108B also serves as a sign indicating that traveling power is generated by using not only the battery energy but also the FC energy. Threshold value information 108B also serves as a sign indicating that switching is made from the EV mode to the FCEV mode.

Figure 11:
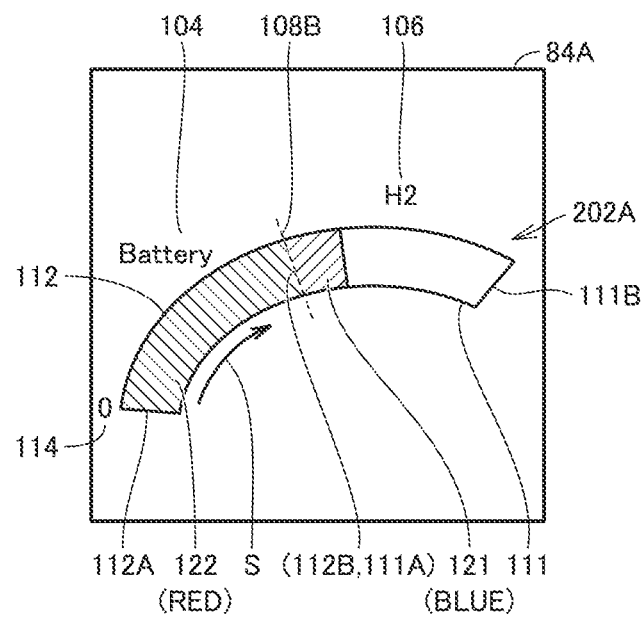
FIG. 11 is a diagram showing an indicator when switching is made from the FC mode to the FCEV mode.

FIG. 11 is a diagram showing that switching is made from the EV mode to the FCEV mode in response to the second control condition being satisfied. FIG. 11 shows an example in which the gauge exceeds the threshold value indicated by threshold value information 108B and first gauge 121 of first indicator 111 is presented.

It should be noted that display ECU 82 receives information indicating the traveling power, information indicating the set mode, and the like from FDC-ECU 60. Based on the received information, display ECU 82 presents the indicator, the increase/decrease of the gauge, and the like.

[Process of Display ECU]

Figure 12:
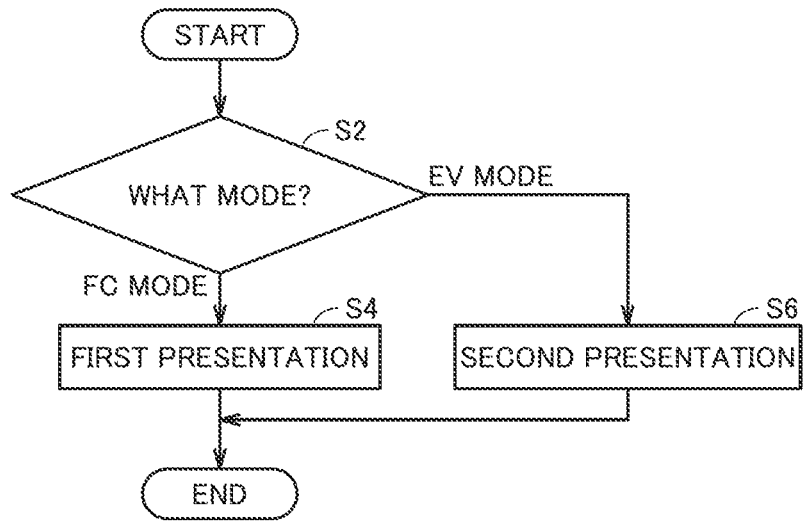
FIG. 12 is a flowchart of a display ECU.

FIG. 12 is a flowchart showing a process of the display ECU. The process of FIG. 12 is started when FCV 1 is activated, for example. In a step S2 of FIG. 12, display ECU 82 determines whether the traveling mode is the FC mode or the EV mode. Display ECU 82 performs this determination based on the information from FDC-ECU 60. When display ECU 82 determines in step S2 that the traveling mode is the FC mode, the process proceeds to a step S4. When display ECU 82 determines that the traveling mode is the EV mode, the process proceeds to a step S6.

In step S4, display ECU 82 performs first presentation. The first presentation is presentation of indicator 201A described with reference to FIG. 8. In step S6, display ECU 82 performs second presentation. The second presentation is presentation of indicator 2012 described with reference to FIG. 10. When the process of step S4 or the process of step S6 is finished, the process of FIG. 12 is finished. When the EV mode is set and is then switched to the FC mode, the presentation of FIG. 10 is switched to the presentation of FIG. 8. When the FC mode is set and is then switched to the EV mode, the presentation of FIG. 8 is switched to the presentation of FIG. 10. It should be noted that in the present embodiment, an indicator in the FCEV mode and an indicator in the CHG mode when the third control condition is satisfied are not shown.

Conclusion (1) FCV 1 of the present embodiment includes: FC system 20; and battery 40 chargeable with electric power supplied from outside. FCV 1 includes: driving device 13 that generates traveling power by using at least one of the FC energy and the battery energy; and display device 84 that presents indicator 201A and indicator 202A each indicating traveling power that is being generated by MG 10. When the traveling power is less than the threshold value, driving device 13 generates the traveling power by using one energy of the energy output from FC system 20 and the energy output from battery 40 without using the other energy of the energy output from FC system 20 and the energy output from battery 40. When the traveling power is more than or equal to the threshold value, driving device 13 generates the traveling power by using the one energy and the other energy. As shown in FIGS. 8 and 10, at the indicator, display device 84 presents information indicating the threshold value (for example, threshold value information 108A in FIG. 8 and threshold value information 108B in FIG. 10).

With such a configuration, at the indicator, the threshold value is presented to indicate that switching is made from the state in which one of the FC energy and the battery energy is used to the state in which both the FC energy and the battery energy are used. Therefore, by allowing the user to recognize the threshold value, the user can easily intuitively recognize the switching of energy used by FCV 1.

(2) As shown in FIG. 8, when the FC mode is set in which the traveling power is generated by using the FC energy, display device 84 presents, as threshold value information 108A at indicator 201A, the sign indicating that driving device 13 generates the traveling power by using not only the FC energy but also the battery energy. When the EV mode is set in which driving device 13 generates the traveling power by using the battery energy, display device 84 presents, as threshold value information 108B at indicator 201B, the sign indicating that driving device 13 generates the traveling power by using not only the battery energy but also the FC energy.

With such a configuration, in the FC mode, the user can recognize the sign indicating that the traveling power is generated by using not only the FC energy but also the battery energy when the traveling power becomes more than or equal to the threshold value. Further, in the EV mode, the user can recognize the sign indicating that the traveling power is generated by using not only the battery energy but also the FC energy when the traveling power becomes more than or equal to the threshold value.

(3) As shown in FIGS. 8 and 10, the indicator includes: first indicator 111 having the extended shape; and second indicator 112 having the extended shape. First indicator 111 includes first gauge 121 that is increased along extension direction S of first indicator 111 in response to an increase in the output of the FC energy. Second indicator 112 includes second gauge 122 that is increased along extension direction S of second indicator 112 in response to an increase in the output of the battery energy. The indicator further includes zero position 114 at which the gauge indicates 0. As shown in FIG. 8, when the FC mode is set, display device 84 presents first indicator 111 and second indicator 112 such that one end 111A of first indicator 111 is located at the zero position and other end 111B of first indicator 111 coincides with one end 112A of second indicator 112. As shown in FIG. 10, when the EV mode is set, display device 84 presents second indicator 112 and first indicator 111 such that one end 112A of second indicator 112 is located at zero position 114 and other end 112B of second indicator 112 coincides with one end 111A of first indicator 111.

With such a configuration, as shown in FIG. 8, when the FC mode is set, first indicator 111 is presented such that one end 111A of first indicator 111 is located at zero position 114. Therefore, the user can intuitively recognize that the FC energy is used with precedence. On the other hand, as shown in FIG. 10, when the EV mode is set, second indicator 112 is presented such that one end 112A of second indicator 112 is located at zero position 114. Therefore, the user can intuitively recognize that the battery energy is used with precedence.

(4) As shown in FIG. 8, when the FC mode is set, display device 84 presents, as threshold value information 108A at the boundary portion between first indicator 111 and second indicator 112, the sign indicating that not only the FC energy but also the battery energy are used. As shown in FIG. 10, when the EV mode is set, display device 84 presents, as threshold value information 108B at the boundary portion between first indicator 111 and second indicator 112, the sign indicating that not only the battery energy but also the FC energy are used.

With such a configuration, when the FC mode is set, display device 84 presents, at the boundary portion between first indicator 111 and second indicator 112, the sign indicating that not only the FC energy but also the battery energy are used. When the EV mode is set, display device 84 presents, at the boundary portion between first indicator 111 and second indicator 112, the sign indicating that not only the EV energy but also the FC energy are used. Therefore, the user can intuitively recognize the energy used.

(5) As shown in FIGS. 8 and 10, in display device 84, first gauge 121 of first indicator 111 is presented in the first color, and second gauge 122 of second indicator 112 is presented in the second color.

With such a configuration, the user can intuitively recognize the gauge that is increased in response to an increase in the output of the FC energy and the gauge that is increased in response to an increase in the output of the battery energy.

(6) As shown in FIGS. 8 and 10, each of the first indicator and the second indicator extends in the arc direction.

With such a configuration, each of first indicator 111 and second indicator 112 can be presented in a presentation region having an arc shape.

Other Embodiments (1) In the foregoing embodiment, it has been described that each of first indicator 111 and second indicator 112 extends in the arc direction. However, each of first indicator 111 and second indicator 112 may extend in a different direction.

Figure 13:
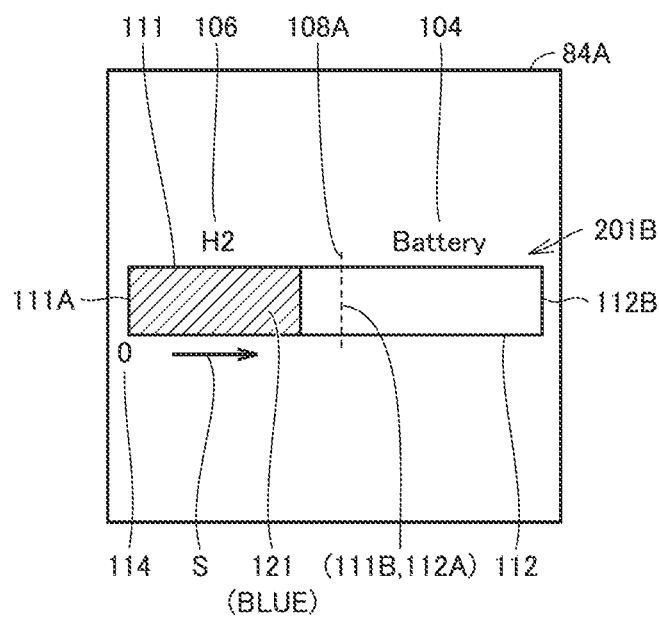
FIG. 13 is a diagram showing an exemplary indicator presented when the FC mode is set, according to another embodiment.
Figure 14:
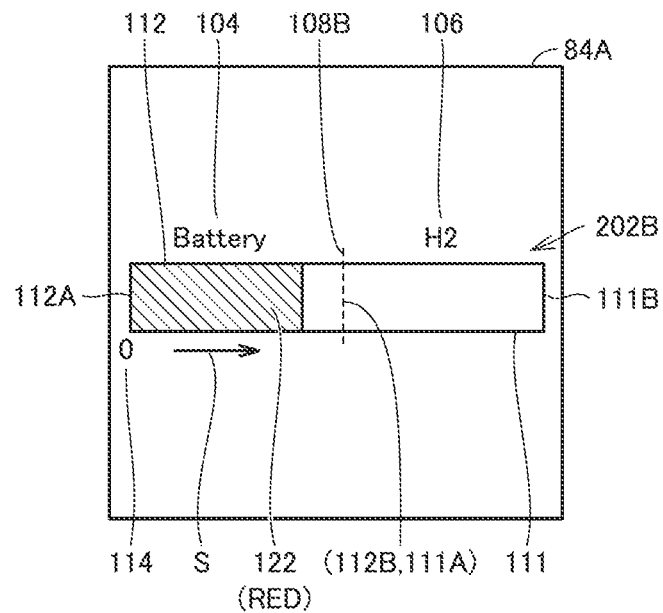
FIG. 14 is a diagram showing an exemplary indicator presented when the EV mode is set, according to the other embodiment.

Each of FIGS. 13 and 14 is a diagram for illustrating an example in which the extending direction of each of first indicator 111 and second indicator 112 is a horizontal direction. The horizontal direction is, for example, a direction in which FCV 1 travels.

FIG. 13 is a diagram showing an indicator 201B when the FC mode is set. FIG. 14 is a diagram showing an indicator 202B when the EV mode is set. When display device 84 is configured to present the indicator shown in each of FIGS. 13 and 14, the indicator can be presented at a horizontal presentation region in presentation region 84A.

Figure 15:
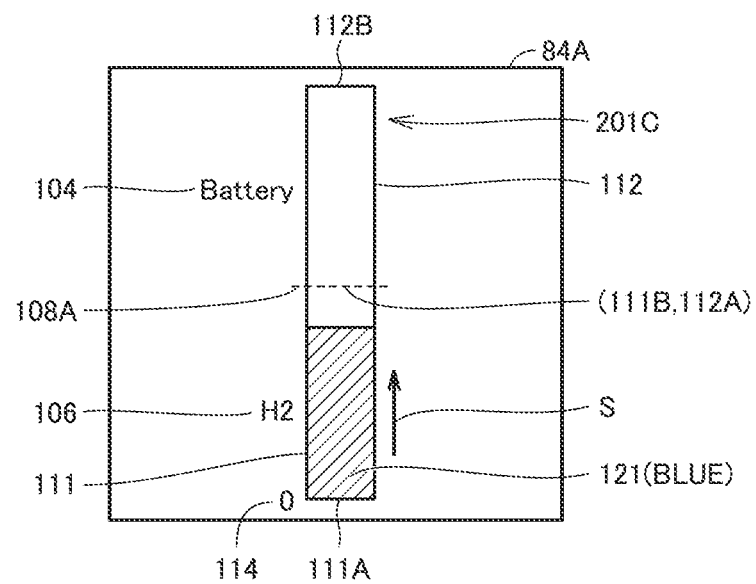
FIG. 15 is a diagram showing an exemplary indicator presented when the FC mode is set, according to the other embodiment.
Figure 16:
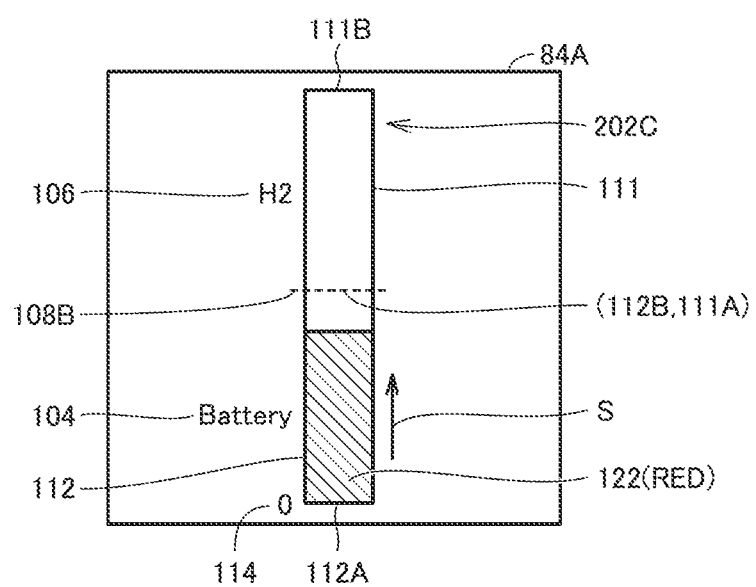
FIG. 16 is a diagram showing an exemplary indicator presented when the FC mode is set, according to the other embodiment.

Each of FIGS. 15 and 16 is a diagram for illustrating an example in which the extension direction of each of first indicator 111 and second indicator 112 is a vertical direction. The vertical direction is, for example, a direction orthogonal to the direction in which FCV 1 travels.

FIG. 15 is a diagram showing an indicator 201C when the FC mode is set. FIG. 16 is a diagram showing an indicator 202C when the EV mode is set. When display device 84 is configured to present the indicator shown in each of FIGS. 15 and 16, the indicator can be presented at a vertical presentation region in presentation region 84A.

(2) At the indicator shown in each of FIGS. 8, 10 and the like, another indicator may be presented to extend from zero position 114 in extending direction S. The other indicator may indicate energy other than the FC energy and the battery energy. The other energy is, for example, energy charged by regenerative power generation of MG 10.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:
1. A vehicle comprising:
a fuel cell;
a power storage device chargeable with electric power supplied from outside;
a driving device that generates traveling power by using at least one of energy output from the fuel cell and energy output from the power storage device; and
a display device that presents an indicator indicating power that is being output from each of the fuel cell and the power storage device, wherein
when the power is less than a threshold value, the driving device generates the traveling power by using one energy of the energy output from the fuel cell and the energy output from the power storage device without using other energy of the energy output from the fuel cell and the energy output from the power storage device, when the power is more than or equal to the threshold value, the driving device generates the traveling power by using the one energy and the other energy, at the indicator, the display device presents information indicating the threshold value, a first mode is set in which the driving device generates the traveling power by using the one energy, a second mode is set in which the driving device generates the traveling power by using the other energy, the indicator includes
- a first indicator having an extended shape, and
- a second indicator having an extended shape,
  - the first indicator includes a gauge that is increased along an extension direction of the first indicator in response to an increase in the output of the one energy,
  - the second indicator includes a gauge that is increased along an extension direction of the second indicator in response to an increase in the output of the other energy, and
  - the indicator further includes a zero position at which the gauges indicate 0,
- when the first mode is set, the display device presents the first indicator and the second indicator such that one end of the first indicator is located at the zero position and the other end of the first indicator coincides with one end of the second indicator, and when the second mode is set, the display device presents the second indicator and the first indicator such that the one end of the second indicator is located at the zero position and the other end of the second indicator coincides with the one end of the first indicator.

2. The vehicle according to claim 1, wherein
when the first mode is set, the display device presents, as the information at a boundary portion between the first indicator and the second indicator, a sign indicating that not only the one energy but also the other energy are used, and when the second mode is set, the display device presents, as the information at the boundary portion between the first indicator and the second indicator, a sign indicating that not only the other energy but also the one energy are used.

3. The vehicle according to claim 1, wherein the display device presents the gauge of the first indicator and the gauge of the second indicator in different manners.

4. The vehicle according to claim 1, wherein each of the first indicator and the second indicator extends in an arc direction.

5. The vehicle according to claim 1, wherein each of the first indicator and the second indicator extends in a horizontal direction.

6. The vehicle according to claim 1, wherein each of the first indicator and the second indicator extends in a vertical direction.

7. The vehicle according to claim 1, wherein when the driving device generates the traveling power with the energy output from the fuel cell being regarded as the one energy and with the energy output from the power storage device being regarded as the other energy.

8. The vehicle according to claim 1, wherein when the driving device generates the traveling power with the energy output from the power storage device being regarded as the one energy and with the energy output from the fuel cell being regarded as the other energy.

* * * * *